July 28, 1964
S. LIPSCHUTZ ETAL
3,142,472
SAFETY CLAMP FOR HOSE
Filed Feb. 3, 1961
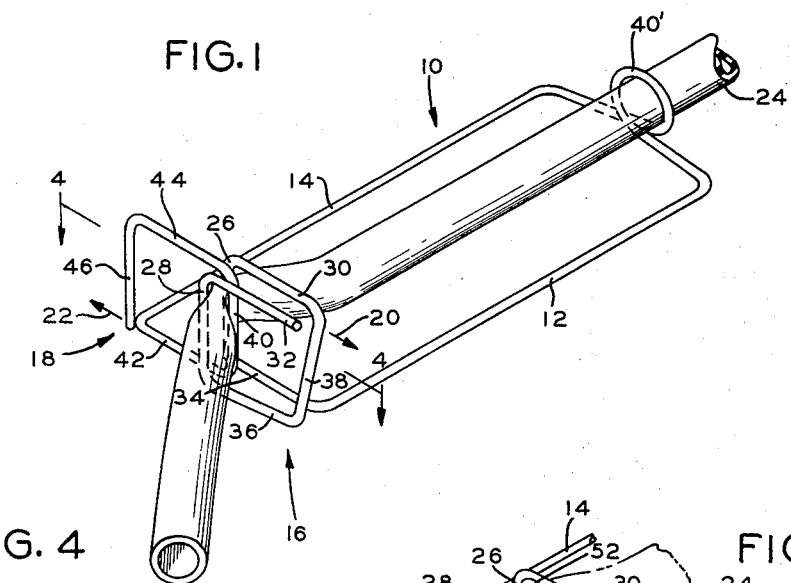
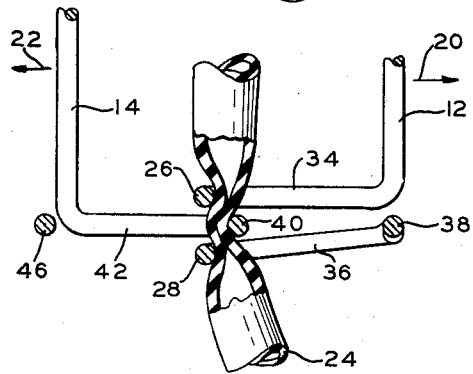
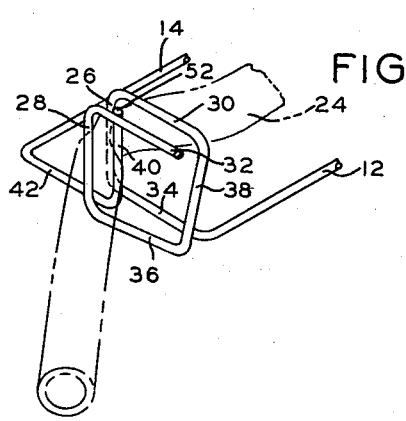
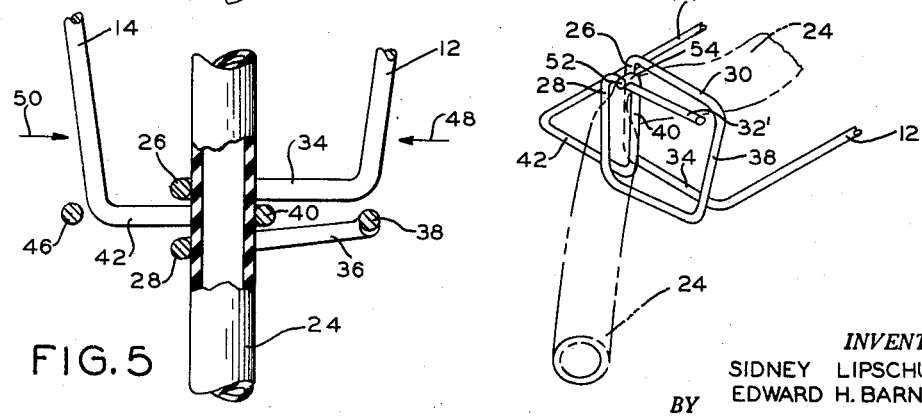
INVENTORS
SIDNEY LIPSCHUTZ
EDWARD H. BARNETT
BY
Caesar and Rivise
ATTORNEYS

United States Patent Office 3,142,472
Patented July 28, 1964

3,142,472
SAFETY CLAMP FOR HOSE
Sidney Lipschutz and Edward H. Barnett, Philadelphia, Pa., assignors, by mesne assignments, to Chemicals Sales, Inc., Philadelphia, Pa., a corporation of Pennsylvania
Filed Feb. 3, 1961, Ser. No. 86,952
4 Claims. (Cl. 251—10)

This invention relates to a safety clamp for exerting a pinching action on a hose of compressible material to preclude further passage of corrosive fluid flowing therein.

It is known to provide a pinch clamp to close the internal passageway of a hose of compressive material. Such clamps have generally proved to be satisfactory although possessing recognized shortcomings. One such shortcoming is that the clamping jaws either were not parallel to each other when manufactured or were quickly misaligned in use. Moreover, occasionally the jaws of the clamp would lock together in a position away from each other thereby permitting the flow of additional liquid until the locked jaws could be freed to clamp against the hose. These shortcomings were usually tolerated because harmless fluids such as water are usually handled by clamp and hose arrangements. Thus, the major risk involved was the creation of a wet counter or floor necessitating the use of a mop.

Where corrosive fluids, such as sulfuric acid for batteries, are being handled, serious risks to person and property are ever present. Here the use of an ordinary pinch clamp can lead to serious accidents because a simple clamping action may permit occasional leaks or because permissible fluid flow, e.g., to fill a battery cell, will not be terminated when desired should the jaws lock together away from the hose or should they become permanently separated.

It is, therefore, an object of the present invention to provide a safety clamp for a hose which exerts a sure, safe, pinching action upon a hose to eliminate leaks.

Another object of this invention is to provide a safety clamp for a hose which cannot lock so as to be incorporative and wherein the jaws cannot become permanently separated from each other.

The foregoing, as well as other objectives of the invention, are fulfilled by providing a safety clamp which includes a confining jaw and a pinching jaw movable relative to each other, a lever member operatively associated with each of the jaws for causing relative movement thereof, the confining jaw comprising two parallel bars and the pinching jaw including a finger disposed in operative position generally parallel to the two parallel bars, the finger being adapted to move toward the bars to force the interposed hose against the bars thereby to cause a pinching action to be exerted on the hose. Pairs of parallel legs extend from the bars and the finger in operative position is disposed adjacent the leg pairs. In one embodiment the finger includes a tab portion lying closely adjacent one of the legs which extends from the bars so as to be contacted by the tab when moved away from the bars thereby preventing the finger from being removed from its interposition adjacent at least one of the pairs of legs. In the preferred embodiment arms extend from the finger and are bridged by a cross-arm to cooperate with the hose to preclude the finger from being removed from its interposition adjacent the pairs of legs.

Other objects and many of the attendant advantages of this invention will be readily appreciated as the same becomes better understood by reference to the following detailed description when considered in connection with the accompanying drawings wherein:

FIG. 1 is a perspective view of a preferred embodiment of the present invention in operative position with an interposed hose;

FIG. 2 is a perspective view of a second embodiment of the present invention in operative position with an interposed hose;

FIG. 3 is a perspective view of a third embodiment of the present invention in operative position with an interposed hose;

FIG. 4 is an enlarged sectional view taken along the lines 4—4 of FIG. 1; and

FIG. 5 is a view similar to FIG. 4 but with the jaws moved so as to relax their grip on the hose thereby permitting fluid flow.

Reference is now made to the various figures of the drawings wherein like reference characters are used for like elements throughout. Attention is called to FIG. 1 wherein there is shown generally at 10 a safety clamp for hose constituting a preferred embodiment of the present invention. Clamp 10 comprises lever members 12 and 14 leading respectively at their forward ends to confining jaw 16 and pinching jaw 18 which have a strong tendency to be urged outwardly away from each other as indicated by arrows 20 and 22 of FIGS. 1 and 4. This tendency is caused by the natural resiliency of the metal from which clamp 10 is constructed. The particular metal, such as a resilient steel, will be at once apparent to those skilled in the art. The two jaws, however, do not become separated by virtue of such natural tendency because of interposed hose 24 as will be discussed hereinafter in greater detail. Instead, the two jaws exert a pinching action upon compressive hose 24. The pinching action may be overcome by moving lever members 12 and 14 closer together as will soon be discussed in greater detail.

Confining jaw 16 comprises parallel bars 26 and 28 formed from the same length of metal stock as lever member 12. Extending from the upper end of bars 26 and 28 as viewed in FIG. 1 is a pair of parallel legs 30 and 32 which are generally perpendicular to bars 26 and 28. In a similar manner a pair of parallel legs 34 and 36 extends from the lower ends of bars 26 and 28 as viewed in FIG. 1, parallel leg pair 34, 36 being parallel to parallel leg pair 30, 32. Legs 30 and 36 are connected by a cross-leg 38 perpendicular thereto. The confining jaw 16 may be fabricated from a single length of material. A short length of the end of the material is chosen as leg 32. A perpendicular bend is then made to form bar 28. Another perpendicular bend creates leg 36. Yet another perpendicular bend establishes cross-leg 38. Still another perpendicular bend establishes leg 30 and a further perpendicular bend creates bar 26. The next perpendicular bend forms leg 34 with a further perpendicular bend establishing lever member 12. The backwardly extending rod-like metal may then be twisted to form loop 40' for receiving and holding hose 24. The remainder of the metal is used to form lever member 14 and pinching jaw 18 as will be soon detailed.

It is thus seen that the entire safety clamp 10 may be formed from a single length of material.

Pinching jaw 18 comprises a finger 40 disposed generally parallel to bars 26, 28 and disposed adjacent legs 30, 32 at one end and legs 34, 36 at the other end. Extending from the ends of finger 40 as viewed in FIG. 1 is a pair of parallel arms 42 and 44 which are perpendicular to finger 40. Arms 42 and 44 are connected by cross-arm 46 perpendicular thereto which serves a safety function as will be discussed hereinafter. Pinching jaw is formed from an extension of lever member 14 which is bent at right angles to form arm 42. A further perpendicular bend creates finger 40 and another perpendicular bend establishes arm 44. A final bend leaves a free end which is cross-arm 46.

In use lever members 12 and 14 are compressed toward each other in the direction of arrows 48 and 50 of FIG. 5 so as to overcome their natural tendency to fly away from each other and reach an equilibrium point. Such compression causes finger 40 to move past bars 26 and 28 so as to be disposed adjacent legs 30 and 32 and adjacent legs 34 and 36. In this position a portion of arm 42 is interposed between legs 34 and 36 and is generally parallel thereto. Likewise, a portion of arm 44 is interposed between legs 30 and 32 and is generally parallel thereto. Finger 40 is moved past bars 26 and 28 as shown in FIG. 5 to permit hose 24 to be inserted between finger 40 and the bars 26, 28. Hose 24 is also positioned between legs 30, 32 and legs 34, 36. When the pressure on lever members 12 and 14 in the direction of arrows 48, 50 is released, the lever members snap away from each other in the direction of arrows 20 and 22 because of their natural resiliency. The jaws 16 and 18, however, do not fly apart because of the presence of interposed hose 24. Instead, finger 40 (FIG. 4) urges hose 24 against bars 26 and 28 to produce a clamping action. It should be observed that in essence two pinching areas exist, one created between finger 40 and bar 26 and the other between finger 40 and bar 28. For this reason, finger 40 and bars 26, 28 need not be precisely mutually parallel thereby avoiding expensive manufacturing precision. The pressure on hose 24 is released to permit fluid flow as shown in FIG. 5 by urging lever members 12 and 14 towards each other in the direction of arrows 48 and 50. This causes finger 40 to back away from bars 26, 28 thereby releasing the pressure on hose 24 which is instantaneously reapplied as soon as one of lever members 12 or 14 is released. Should the pressure on lever members 12 and 14 be very great, finger 40 still cannot escape from its confinement between legs 30 and 32 and from between legs 34 and 36. This safety feature exists because in such a case cross-arm 46 will be brought to abut against hose 24.

The embodiment of FIG. 2 is similar to the preferred embodiment of FIG. 1 except that arm 44 and cross-arm 46 are removed from finger 40 which terminates in a free end 52. This embodiment necessitates slightly less material, but there is a possibility that finger 40 might be forced free of the parallel legs.

The embodiment of FIG. 3 is similar to that of FIG. 2 with free end 52 of finger 40 slightly extended and a short section running therefrom bent at right angles to form tab portion 54 which in clamping position lies closely adjacent to leg 32' which is displaced at a slight obtuse angle to bar 28 so as to be contacted by tab portion 54 when it, as well as finger 40, is moved away from bars 26, 28 as when fluid flow is desired. Further retrogressive movement of finger 40 is, however, prevented by abutments thereof against the displaced leg 32' thereby preventing finger 40 from being removed from its interposition between the leg pairs.

It is thus seen that a safety clamp is provided which provides a dependable pinching action by virtue of a coordination of parallel jaws which cannot be accidentally disrupted. Moreover, since the present clamp is constructed of a wire-like material instead of a planar material, there is considerably less surface area present to plate with corrosion resistant materials, thereby cutting such cost.

Obviously many modifications and variations of the present invention are possible in the light of the above teachings. It is, therefore, to be understood that within the scope of the appended claims, the invention may be practiced otherwise than as specifically described.

What is claimed as the invention is:

1. A safety clamp for exerting a pinching action on a hose of compressible material to preclude further passage of corrosive fluid flowing therein comprising in combination a confining jaw and a pinching jaw movable relative to each other, means for urging said jaws apart, a lever member operatively associated with each of said jaws for causing relative movement thereof counter to the natural movement of the jaws apart, said confining jaw comprising two substantially parallel bars, pairs of legs in generally parallel relationship to each other extending from said bars, said pinching jaw including a finger disposed in operative position generally parallel to said bars and disposed adjacent each of said leg pairs, two generally parallel arms perpendicular to said finger extending therefrom, said parallel arms being bridged by a cross-arm generally parallel to said finger whereby in operative position said hose is positioned between said leg pairs and is interposed between said bar pair and said finger, said urging means tending to compel said finger to move toward said bars to force said hose against said bars thereby to cause a pinching action to be exerted upon said hose and whereby said cross-arm is adapted to abut against said hose to preclude said finger from being removed from its disposition within each of said leg pairs.

2. A safety clamp for exerting a pinching action on a hose of compressible material to preclude further passage of fluid flowing therein comprising in combination a confining jaw and a pinching jaw movable relative to each other, said hose being interposable therebetween, a lever member operatively associated with each of said jaws for causing relative movement thereof, said confining jaw comprising a first and second parallel bar, said pinching jaw including a finger disposed in operative position generally parallel to said two bars and positioned therebetween, pairs of legs in generally parallel relationship to each other extending from said bars, said hose being positionable between said leg pairs and against said parallel bars, said finger in operative position being disposed adjacent at least one of said pairs of legs and forcing said hose against said bars, means for urging said jaws apart, with the interposition of said hose between said jaws preventing their moving apart, whereby two pinching areas on said hose exist, one between said finger and said first parallel bar, and the other between said finger and said second parallel bar, at least one arm extending from said finger to cooperate with said hose to preclude said finger from being removed from its interposition between at least one of said pairs of legs.

3. A safety clamp for exerting a pinching action on a hose of compressible material to preclude further passage of fluid flowing therein comprising in combination a confining jaw and a pinching jaw movable relative to each other, said hose being interposable therebetween, a lever member operatively associated with each of said jaws for causing relative movement thereof, said confining jaw comprising a first and second parallel bar, said pinching jaw including a finger disposed in operative position generally parallel to said two bars and positioned therebetween, pairs of legs in generally parallel relationship to each other extending from said bars, said hose being positionable between said leg pairs and against said parallel bars, said finger in operative position being disposed adjacent at least one of said pairs of legs and forcing said hose against said bars, means for urging said jaws apart, with the interposition of said hose between said jaws preventing their moving apart, whereby two pinching areas on said hose exist, one between said finger and said first parallel bar, and the other between said finger and said second parallel bar, two generally parallel arms perpendicular to said finger extending therefrom, said parallel arms being bridged by a crossarm generally parallel to said finger whereby said crossarms is adapted to abut against said hose to prevent said finger from being removed from its interposition adjacent at least one of said pairs of legs.

4. The invention of claim 3 wherein said clamp is integrally formed from a single piece of resilient wire.

References Cited in the file of this patent
UNITED STATES PATENTS

| | | |
|---|---|---|
| 200,113 | Weed | Feb. 5, 1878 |
| 616,657 | Gaines | Dec. 27, 1898 |
| 682,172 | Chaddock | Sept. 10, 1901 |
| 754,285 | Dick | Mar. 8, 1904 |
| 951,133 | Kitts | Mar. 8, 1910 |
| 1,397,481 | Avery | Nov. 15, 1921 |
| 2,127,257 | Hornberger | Aug. 16, 1938 |